US012625878B2

(12) United States Patent
Bensberg et al.

(10) Patent No.: US 12,625,878 B2
(45) Date of Patent: May 12, 2026

(54) COMPLEX DIMENSION FUNCTIONS IN PIVOT AGGREGATIONS

(71) Applicant: SAP SE, Walldorf (DE)

(72) Inventors: Christian Bensberg, Heidelberg (DE); Kai Stammerjohann, Wiesloch (DE); Frederik Transier, Bammental (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/924,789

(22) Filed: Oct. 23, 2024

(65) Prior Publication Data

US 2026/0111438 A1 Apr. 23, 2026

(51) Int. Cl.
*G06F 16/25* (2019.01)
*G06F 16/2455* (2019.01)
(52) U.S. Cl.
CPC ...... *G06F 16/258* (2019.01); *G06F 16/24556* (2019.01)
(58) Field of Classification Search
CPC .. G06F 40/18; G06F 16/2282; G06F 16/2255; G06F 16/258; G06F 16/24556
See application file for complete search history.

(56) References Cited

U.S. PATENT DOCUMENTS

| | | | | |
|---|---|---|---|---|
| 12,001,467 | B1 * | 6/2024 | U | G06F 16/35 |
| 2019/0361795 | A1 * | 11/2019 | Cole | G06F 11/0751 |
| 2024/0346025 | A1 * | 10/2024 | Wu | G06F 16/24561 |
| 2025/0094418 | A1 * | 3/2025 | Chintala | G06F 16/24534 |

OTHER PUBLICATIONS

Meraj Khan, Larry Xu, Arnab Nandi, and Joseph M. Hellerstein. 2017. Data tweening: incremental visualization of data transforms. Proc. VLDB Endow. 10, 6 (Feb. 2017), 661-672. (Year: 2017).*
Muller et al., Cache-Efficient Aggregation: Hashing Is Sorting, SIGMOD '15: Proceedings of the 2015 ACM SIGMOD International Conference on Management of Data (May 2015), pp. 1123-1136. (Year: 2015).*

* cited by examiner

*Primary Examiner* — Cheyne D Ly
(74) *Attorney, Agent, or Firm* — SCHWEGMAN LUNDBERG & WOESSNER, P.A.

(57) ABSTRACT

Systems and methods described herein relate to techniques for performing a pivot aggregation on a set of data using intermediate maps and intermediate pages. The intermediate maps and the intermediate pages reduce the computational complexity of pivot aggregations into a series of operations that are less computationally complex and may be performed in parallel. The techniques described herein improve efficiency in database technology by reducing computational complexity of pivot aggregations.

20 Claims, 9 Drawing Sheets

130

DIMENSION FUNCTION SYSTEM

202 — DIMENSION MODULE

204 — INTERMEDIATE MAPPING MODULE

206 — INTERMEDIATE PAGES MODULE

208 — AGGREGATION MODULE

400

| PRODUCT | COUNTRY | TIMESTAMP | QUANTITY |
|---------|---------|-----------|----------|
| PRODUCT A | GERMANY | 2024-01-04 | 2 |
| PRODUCT A | GERMANY | 2024-02-01 | 4 |
| PRODUCT B | FRANCE | 2023-10-23 | 2 |
| PRODUCT A | GERMANY | 2023-01-04 | 7 |
| PRODUCT C | GERMANY | 2023-12-12 | 1 |
| PRODUCT B | FRANCE | 2023-11-02 | 3 |
| PRODUCT A | FRANCE | 2024-01-23 | 7 |

| TIMESTAMP | BUCKETS |
|-----------|---------|
| 2024-01-04 | [Q1.2024], [M1.2024] |
| 2024-02-01 | [Q1.2024], [M2.2024] |
| 2023-10-23 | [Q4.2023], [M10.2023] |
| 2023-12-12 | [Q4.2023], [M12.2023] |
| 2023-11-02 | [Q4.2023], [M11.2023] |
| 2024-03-23 | [Q1.2024], [M3.2024] |

500

318   320   324   326   316   404   406   402

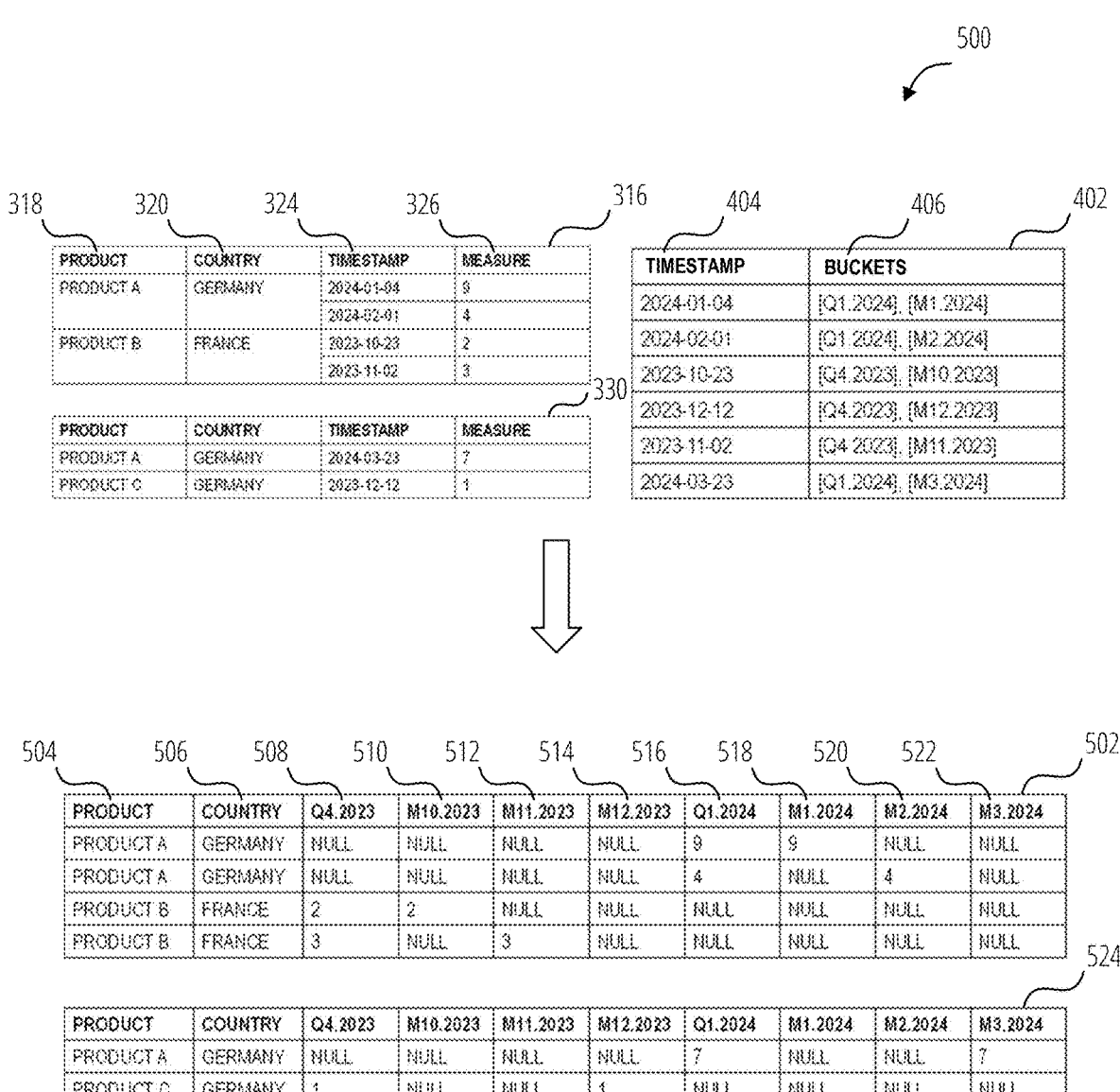

| PRODUCT | COUNTRY | TIMESTAMP | MEASURE |
|---------|---------|-----------|---------|
| PRODUCT A | GERMANY | 2024-01-04 | 9 |
|  |  | 2024-02-01 | 4 |
| PRODUCT B | FRANCE | 2023-10-23 | 2 |
|  |  | 2023-11-02 | 3 |

| PRODUCT | COUNTRY | TIMESTAMP | MEASURE |
|---------|---------|-----------|---------|
| PRODUCT A | GERMANY | 2024-03-23 | 7 |
| PRODUCT C | GERMANY | 2023-12-12 | 1 |

330

| TIMESTAMP | BUCKETS |
|-----------|---------|
| 2024-01-04 | [Q1.2024], [M1.2024] |
| 2024-02-01 | [Q1.2024], [M2.2024] |
| 2023-10-23 | [Q4.2023], [M10.2023] |
| 2023-12-12 | [Q4.2023], [M12.2023] |
| 2023-11-02 | [Q4.2023], [M11.2023] |
| 2024-03-23 | [Q1.2024], [M3.2024] |

504   506   508   510   512   514   516   518   520   522   502

| PRODUCT | COUNTRY | Q4.2023 | M10.2023 | M11.2023 | M12.2023 | Q1.2024 | M1.2024 | M2.2024 | M3.2024 |
|---------|---------|---------|----------|----------|----------|---------|---------|---------|---------|
| PRODUCT A | GERMANY | NULL | NULL | NULL | NULL | 9 | 9 | NULL | NULL |
| PRODUCT A | GERMANY | NULL | NULL | NULL | NULL | 4 | NULL | 4 | NULL |
| PRODUCT B | FRANCE | 2 | 2 | NULL | NULL | NULL | NULL | NULL | NULL |
| PRODUCT B | FRANCE | 3 | NULL | 3 | NULL | NULL | NULL | NULL | NULL |

524

| PRODUCT | COUNTRY | Q4.2023 | M10.2023 | M11.2023 | M12.2023 | Q1.2024 | M1.2024 | M2.2024 | M3.2024 |
|---------|---------|---------|----------|----------|----------|---------|---------|---------|---------|
| PRODUCT A | GERMANY | NULL | NULL | NULL | NULL | 7 | NULL | NULL | 7 |
| PRODUCT C | GERMANY | 1 | NULL | NULL | 1 | NULL | NULL | NULL | NULL |

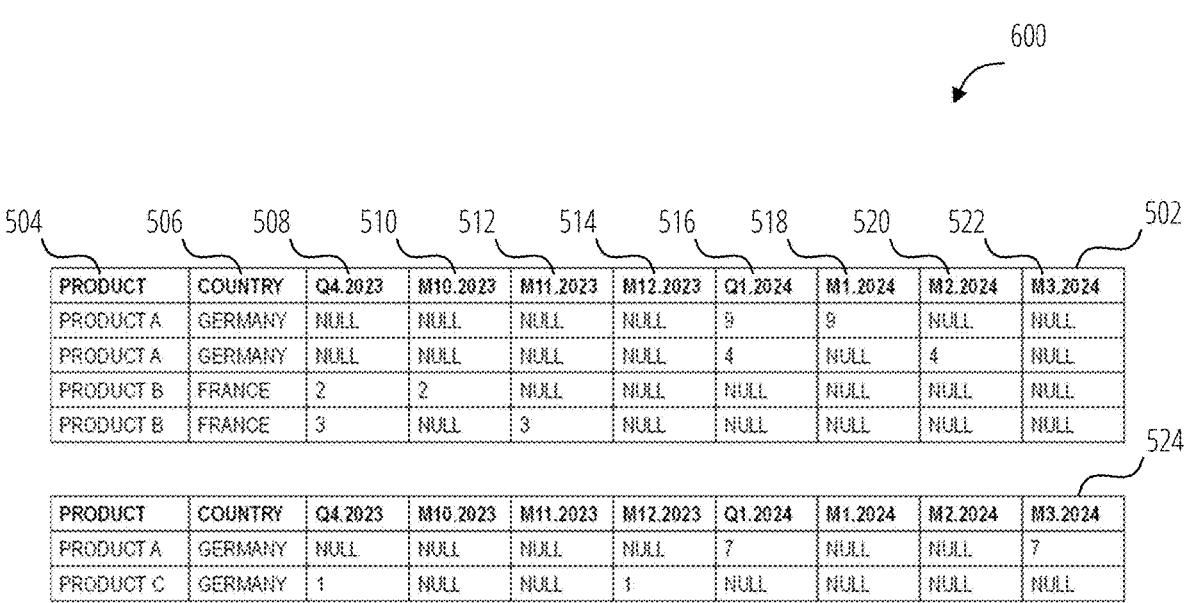

| PRODUCT | COUNTRY | Q4.2023 | M10.2023 | M11.2023 | M12.2023 | Q1.2024 | M1.2024 | M2.2024 | M3.2024 |
|---|---|---|---|---|---|---|---|---|---|
| PRODUCT A | GERMANY | NULL | NULL | NULL | NULL | 9 | 9 | NULL | NULL |
| PRODUCT A | GERMANY | NULL | NULL | NULL | NULL | 4 | NULL | 4 | NULL |
| PRODUCT B | FRANCE | 2 | 2 | NULL | NULL | NULL | NULL | NULL | NULL |
| PRODUCT B | FRANCE | 3 | NULL | 3 | NULL | NULL | NULL | NULL | NULL |

| PRODUCT | COUNTRY | Q4.2023 | M10.2023 | M11.2023 | M12.2023 | Q1.2024 | M1.2024 | M2.2024 | M3.2024 |
|---|---|---|---|---|---|---|---|---|---|
| PRODUCT A | GERMANY | NULL | NULL | NULL | NULL | 7 | NULL | NULL | 7 |
| PRODUCT C | GERMANY | 1 | NULL | NULL | 1 | NULL | NULL | NULL | NULL |

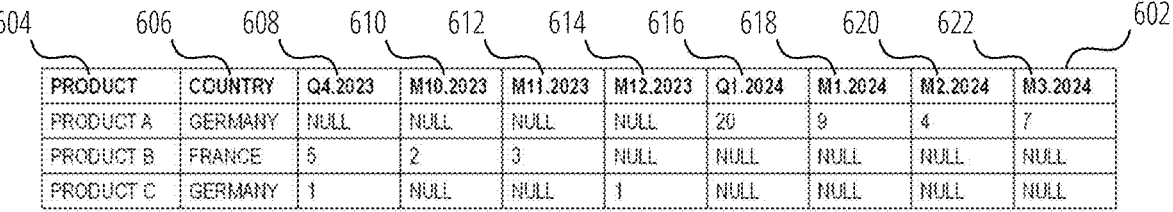

| PRODUCT | COUNTRY | Q4.2023 | M10.2023 | M11.2023 | M12.2023 | Q1.2024 | M1.2024 | M2.2024 | M3.2024 |
|---|---|---|---|---|---|---|---|---|---|
| PRODUCT A | GERMANY | NULL | NULL | NULL | NULL | 20 | 9 | 4 | 7 |
| PRODUCT B | FRANCE | 5 | 2 | 3 | NULL | NULL | NULL | NULL | NULL |
| PRODUCT C | GERMANY | 1 | NULL | NULL | 1 | NULL | NULL | NULL | NULL |

FIG. 6

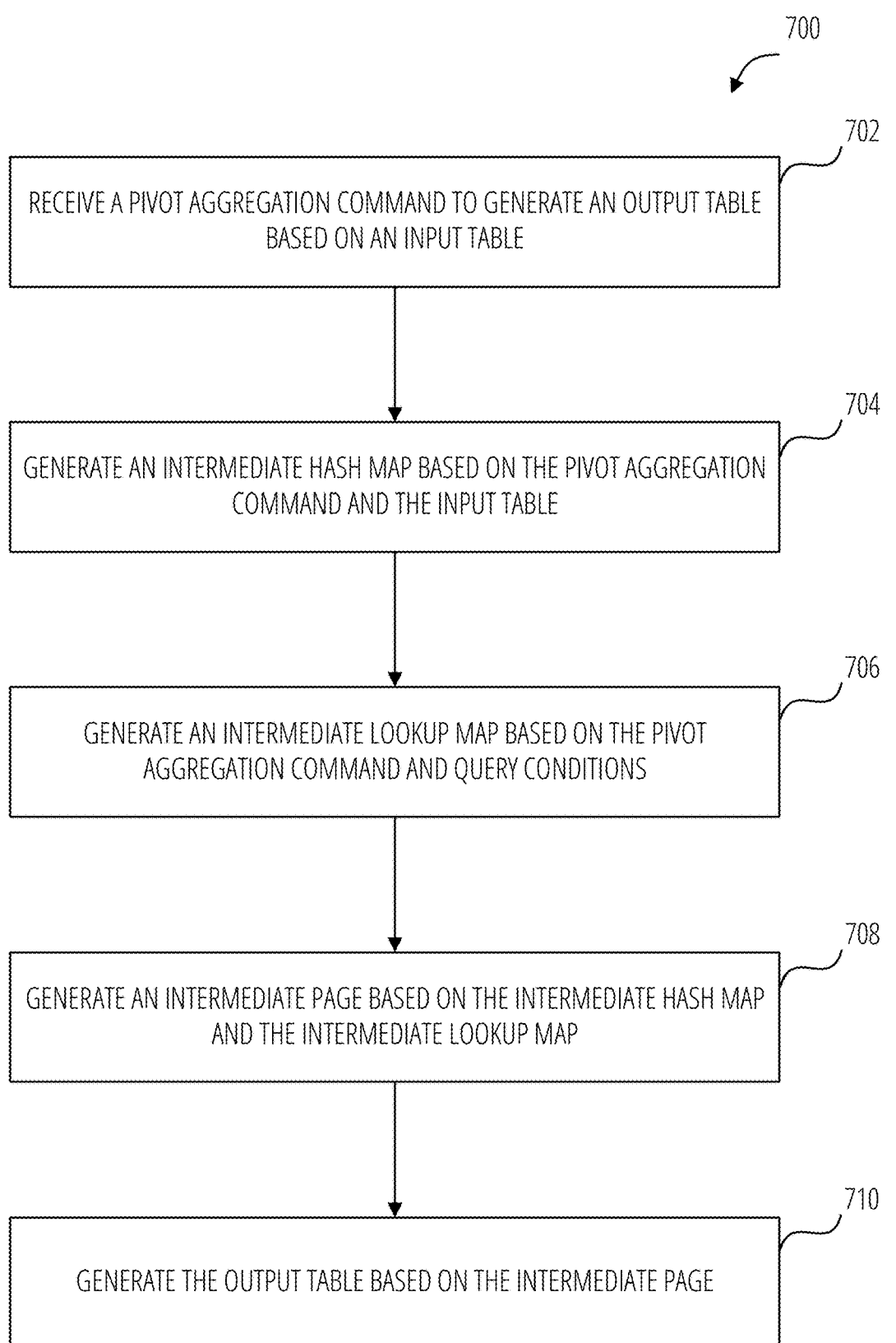

700

702

RECEIVE A PIVOT AGGREGATION COMMAND TO GENERATE AN OUTPUT TABLE
BASED ON AN INPUT TABLE

704

GENERATE AN INTERMEDIATE HASH MAP BASED ON THE PIVOT AGGREGATION
COMMAND AND THE INPUT TABLE

706

GENERATE AN INTERMEDIATE LOOKUP MAP BASED ON THE PIVOT
AGGREGATION COMMAND AND QUERY CONDITIONS

708

GENERATE AN INTERMEDIATE PAGE BASED ON THE INTERMEDIATE HASH MAP
AND THE INTERMEDIATE LOOKUP MAP

710

GENERATE THE OUTPUT TABLE BASED ON THE INTERMEDIATE PAGE

FIG. 7

COMPLEX DIMENSION FUNCTIONS IN PIVOT AGGREGATIONS

TECHNICAL FIELD

The subject matter disclosed herein generally relates to database technology. More specifically, but not exclusively, the subject matter described herein relates to data transformation techniques for dimensional data.

BACKGROUND

Various industries use database technology for organizing, storing, and analyzing data. As these industries become more technically advanced, the need for advancements in database technology increases. For example, one way in which database technology has advanced is by providing new functions for analyzing data. However, as various industries become more technically advanced, the data for which these industries use database technologies also grows increasingly complex. This creates various technical challenges in the field of database technology because functions that cannot efficiently operate on data quickly become practically inoperative as the data becomes more complex.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. It should be understood that additional and alternative examples are possible without departing from the principles of the subject matter described herein.

FIG. 5 is a block diagram of an example of performing pivot aggregation operations, according to some examples.

FIG. 6 is a block diagram of an example of performing pivot aggregation operations, according to some examples.

FIG. 7 is a flowchart showing an example method, according to some examples.

DETAILED DESCRIPTION

Figure 1:
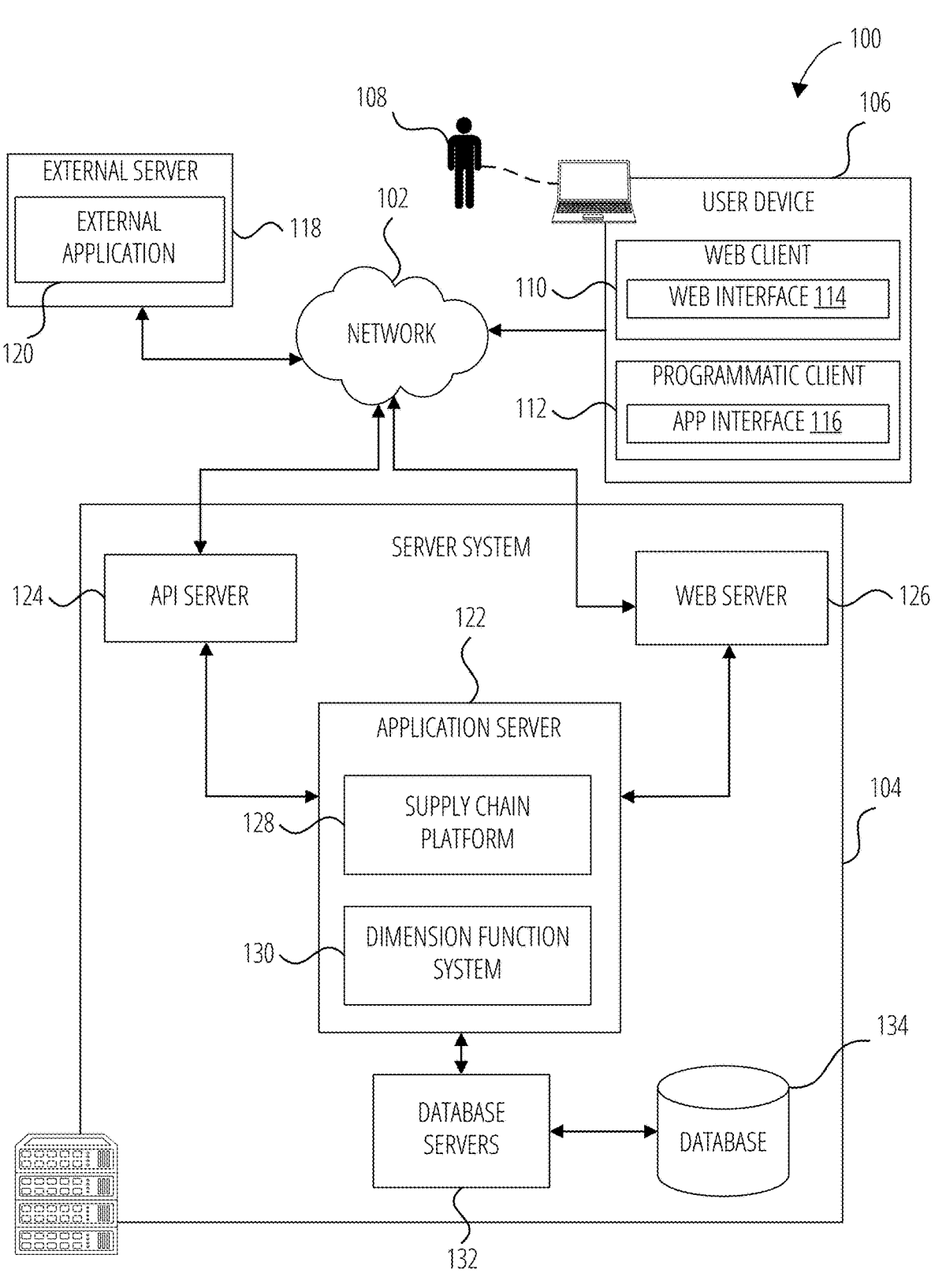
FIG. 1 diagrammatically illustrates a network environment that includes a dimension function system, according to some examples.

In general, pivot aggregations are data transformation techniques that involve converting data organized in rows of a first table to data organized in columns of a second table. Converting data in this way supports dynamic aggregation, sorting, and filtering of data. For example, pivot aggregations are used to summarize large sets of data, create cross-tabular reports, and facilitate various data analysis functions. In performing a pivot aggregation, a set of conditions, which are expressed, for example, in case statements, sum statements, count statements, average statements, and the like, are applied to each row of a first table to convert data organized in each row of the first table into columns of a second table. As illustrated here, performing the pivot aggregation is computationally complex (e.g., N×M complexity, number of rows times number of conditions) because every condition is applied to every row of data in the first table. Thus, pivot aggregations are inefficient and resource-intensive operations, especially for large sets of data. These technical challenges are exacerbated where dimensional functions are involved in pivot aggregations. For example, a set of data with time-based dimensions can include rows with timestamps, or other condition values, that satisfy multiple time-based conditions for a pivot aggregation. Performing the pivot aggregation on this set of data would involve further complexity in addition to the already computationally complex operation of applying each condition to each row in the set of data. Thus, database technologies using dimensional functions in pivot aggregations face technical challenges arising from computational complexity and computational inefficiency.

The subject matter described herein addresses these and other technical challenges arising in the field of database technologies. As an overview, the subject matter described herein provides for techniques for performing a pivot aggregation on a set of data using intermediate maps (e.g., hash maps, lookup maps) and intermediate pages (e.g., local pages). The intermediate maps and the intermediate pages allow for the pivot aggregation to be performed with reduced computational complexity by reducing the computationally complex pivot aggregation operation into less computationally complex operations (e.g., lookup operations). Furthermore, the intermediate maps and the intermediate pages are generated in parallel for improved efficiency, and in some examples, the intermediate maps and the intermediate pages are used for subsequent pivot aggregations performed on the same set of data, which provides further improvements to efficiency. Thus, through improved techniques for performing pivot aggregations, database technologies are improved with respect to computational complexity and efficiency.

In some examples, a pivot aggregation system identifies dimensions for an output table (e.g., result table, pivot table) based on a pivot aggregation command for an input table (e.g., line-item table). For example, a pivot aggregation command includes one or more identifiers (e.g., "group by" identifiers) that identify groups by which the data entries (e.g., rows, columns) of an input table are to be aggregated for an output table. The pivot aggregation command includes one or more filter conditions that provide the conditions under which the data entries of the input table are to be aggregated for the output table. The dimensions for the output table are based on the identified groups and the filter conditions. For example, for a pivot aggregation command that transforms rows to columns, the dimensions for the output table include columns corresponding to the labels for the identified groups (e.g., outer "group by" columns) and the filter conditions (e.g., inner "group by" columns). The dimensions for the output table include rows corresponding to the groups identified by the pivot aggregation command to be aggregated.

In some examples, the pivot aggregation system generates intermediate hash maps and intermediate lookup maps based on the input table and the dimensions for the output table. The pivot aggregation system generates the intermediate hash maps by grouping data entries (e.g., rows) in the input table by the identified groups and filter condition values identified from the pivot aggregation command. The intermediate maps organize the data entries that belong to the same identified groups together and aggregate (e.g., sum) numeric measures (e.g., key figures) of the data entries with the same filter condition values. The pivot aggregation system generates intermediate lookup maps by identifying the filter conditions, or buckets, that each filter condition value satisfy. For each data entry in the input table, the intermediate lookup map identifies the filter conditions that the filter condition value of the data entry satisfy. The intermediate hash maps and the intermediate lookup maps generated by the pivot aggregation system facilitate analyzing which data entries satisfy which conditions in the pivot aggregation command using lookup operations. These lookup operations are relatively less complex than applying each filter condition in the pivot aggregation command to each data entry in the input table, and therefore, provide for improvements in efficiency and computational complexity.

In some examples, the pivot aggregation system generates intermediate pages based on the intermediate hash maps and the intermediate lookup maps. The pivot aggregation system iterates through each row of the intermediate hash maps and uses the intermediate lookup maps to identify the appropriate filter conditions, or buckets, that the row satisfies. The pivot aggregation system generates the intermediate pages with dimensions based on the pivot aggregation command. The dimensions of the intermediate pages correspond with the dimensions for the output table. For each row of the intermediate pages, a row from the intermediate hash map is entered with the numeric measures entered in the appropriate column. By iterating through each row of the intermediate hash maps and storing each row in the intermediate hash maps as a row in the intermediate pages with numeric measures in the appropriate columns, the pivot aggregation system has effectively performed a pivot operation using lookup operations. Again, these lookup operations are relatively less complex than applying each filter condition in the pivot aggregation command to each data entry in the input table, and therefore, provide for improvements in efficiency and computational complexity.

In some examples, the pivot aggregation system generates the output table based on the intermediate pages. The pivot aggregation system aggregates the rows of the intermediate pages so that the numeric measures for rows of the same group are aggregated together. The pivot aggregation system generates the output table using the aggregated rows of the intermediate pages. As illustrated in these examples, a pivot aggregation operation is performed on an input table using a series of lookup operations, which generally have linear complexity (e.g., N complexity). This series of lookup operations is computationally less complex than applying each filter condition in the pivot aggregation command to each data entry in the input table, which has quadratic complexity (e.g., N×M complexity). Thus, the pivot aggregation system provides improved efficiency and reduced computational complexity that scales with increasingly complex data.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 108. A web client 110 (e.g., a browser) or a programmatic client 112 (e.g., an "app") may be hosted and executed on the user device 106.

An Application Program Interface (API) server 124 and a web server 126 provide respective programmatic and web interfaces to components of the server system 104. A specific application server 122 hosts a supply chain platform 128 and a pivot aggregation system 130, each of which includes components, modules, or applications. It is noted that the supply chain platform 128 and the pivot aggregation system 130 can be hosted via separate application servers in some examples.

The user device 106 can communicate with the application server 122, such as via the web interface supported by the web server 126 or via the programmatic interface provided by the API server 124. It will be appreciated that, although only a single user device 106 is shown in FIG. 1, a plurality of user devices may be communicatively coupled to the server system 104 in some examples. Further, while certain functions may be described herein as being performed at either the user device 106 (e.g., web client 110 or programmatic client 112) or the server system 104, the location of certain functionality either within the user device 106 or the server system 104 may be a design choice. Furthermore, while certain functions may be described herein as being performed at a particular system, such as the pivot aggregation system 130, the location of the functionality may also be a design choice. For instance, some functionality described with reference to the pivot aggregation system 130 can be performed by the supply chain platform 128 or by both the pivot aggregation system 130 and the supply chain platform 128.

The application server 122 is communicatively coupled to database servers 132, facilitating access to one or more information storage repositories, such as a database 134. In some examples, the database 134 includes storage devices that store information to be accessed, processed, modified, or deleted by the supply chain platform 128 or the pivot aggregation system 130.

The application server 122 accesses application data (e.g., application data stored by the database servers 132) to provide one or more applications or software tools to the user device 106 via a web interface 114 or an app interface 116. The supply chain platform 128 is an example of a platform with one or more applications or software tools, provided via the application server 122.

The supply chain platform 128 can facilitate the tracking, coordination, and execution of supply chain activities (e.g., ranging from procurement to distribution). In some examples, the supply chain platform 128 allows organizations to streamline and digitize their procurement lifecycle using a cloud-based architecture, integrating with the database 134 for fast processing of large datasets and real-time insights. Various data objects are created and used to manage and operate the supply chain platform 128. For example, various data objects, corresponding to real-world business entities or objects, can be mapped to tables in the database 134, and such tables (and thus their data objects) can be interconnected based on hierarchies, dependencies, or references.

In some examples, the supply chain platform 128 integrates with other systems to enhance functionality, such as interfacing with the pivot aggregation system 130 to ensure efficient data management. For instance, the supply chain platform 128 may utilize the pivot aggregation system 130 to remove outdated or unnecessary data, or data specifically requested to be removed by users, thereby improving system performance or compliance with data retention policies.

In some examples, the pivot aggregation system 130 is a centralized system configured to execute pivot aggregation operations for various functions, including dimension functions. For example, the pivot aggregation system 130 handles pivot aggregation commands to perform pivot aggregation operations from users of the supply chain platform 128. In some examples, the supply chain platform 128 and the pivot aggregation system 130 work together to perform pivot aggregation operations on data objects supported by the supply chain platform 128.

It is noted that the supply chain platform 128 is merely an example of a platform or system that can benefit from features of the pivot aggregation system 130. The pivot aggregation system 130 can, for example, operate to perform pivot aggregation operations with respect to data objects related to other platforms or systems, such as human resources systems, enterprise resource planning (ERP) systems, or accounting systems.

In some examples, the application server 122 is part of a cloud-based platform provided by a software provider that allows the user 108 to utilize the tools of the supply chain platform 128, the pivot aggregation system 130, and, where applicable, other systems or subsystems (e.g., a human resources system, ERP system, or accounting system, as mentioned).

One or more of the application server 122, the database servers 132, the API server 124, the web server 126, and the supply chain platform 128 may each be implemented in a computer system, in whole or in part, as described below with respect to FIG. 9. In some examples, external applications (which may be third-party applications or other applications provided by the same software provider), such as an external server 118 executing on an external application 120, can communicate with the application server 122 via the programmatic interface provided by the API server 124. For example, a third-party application may support one or more features or functions on a website or platform hosted by a third party, or may perform certain methodologies and provide input or output information to the application server 122 for further processing.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

Figure 2:
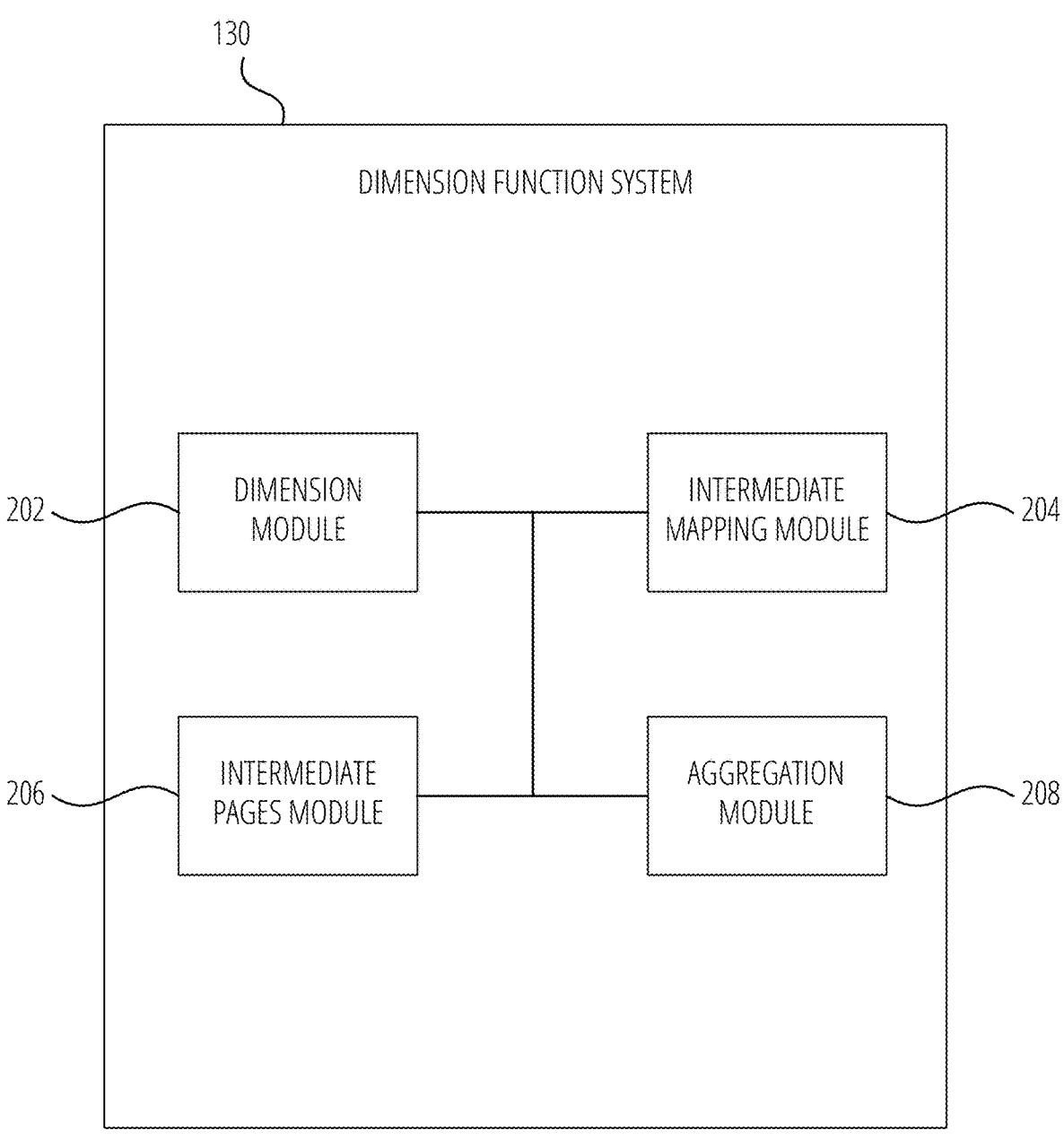
FIG. 2 is a block diagram of components of a dimension function system, according to some examples.

FIG. 2 is a block diagram illustrating components of the pivot aggregation system 130 of FIG. 1, according to some examples. In FIG. 2, the pivot aggregation system 130 is shown to include a dimension module 202, an intermediate mapping module 204, an intermediate pages module 206, and an aggregation module 208.

The dimension module 202 is responsible for identifying dimensions for an output table based on a pivot aggregation command for an input table. In general, a pivot aggregation command includes a dimension function (e.g., select) that involves pivot aggregation operations. The dimension module 202 identifies the dimensions (e.g., rows, columns) for the output table based on the dimension function. For example, a dimension function specifies groups and filter conditions for grouping and aggregating data entries of an input table. The dimensions of the output table correspond with the groups by which the data entries in the input table are grouped by and the filter conditions by which these groups are filtered. For example, a pivot aggregation command follows the format:

```
FUNCTION
        GROUP A, GROUP B, ... GROUP N
    FILTER CONDITION FOR AGGREGATE A,
    FILTER CONDITION FOR AGGREGATE B,
        ...
    FILTER CONDITION FOR AGGREGATE M
        FROM TABLE
    GROUP BY GROUP A, GROUP B, ... GROUP N;
``` where FUNCTION is a dimension function (e.g., select) that involves pivot aggregation on a set of data, GROUP A, GROUP B, . . . GROUP N are identifiers for groups, FILTER CONDITION A, FILTER CONDITION B, . . . FILTER CONDITION FOR AGGREGATE M are filter conditions for aggregates (e.g., case, sum, avg, count, max, min) for the groups, and TABLE is an input table. In the above example, the dimension function (e.g., FUNCTION) involves pivot aggregation that converts rows to columns. The identifiers for the groups (e.g., GROUP A, GROUP B, . . . GROUP N) identify columns of the input table (e.g., TABLE). The dimension function "pivots" around these columns for the pivot aggregation. Thus, the identifiers for the groups identify columns (e.g., outer "group by" columns) of the output table. The filter conditions (e.g., FILTER CONDITION A, FILTER CONDITION B, . . . . FILTER CONDITION M) provide the conditions under which the key figures for each group are to be aggregated for the output table. Thus, the filter conditions provide columns (e.g., inner "group by" columns) of the output table.

For example, an input table includes a first column for products sold, a second column for geographical locations where the products were sold, a third column for quantities of products sold. The input table includes rows, with each row providing a product sold, a location where the product was sold, and a quantity of the product sold. A pivot aggregation command is provided with a dimension function that involves pivot aggregation operations to group the products sold, aggregated by which country the products were sold. The pivot aggregation operations convert the rows of the input table to columns, with each row providing a product sold and a total quantity of the product sold in each country. The example pivot aggregation command is:

```
SELECT
        PRODUCT,
    SUM(CASE WHEN REGIONS.LABEL = 'COUNTRY A' THEN
QUANTITY ELSE 0) AS "COUNTRY A",
    SUM(CASE WHEN REGIONS.LABEL = 'COUNTRY B' THEN
QUANTITY ELSE 0) AS "COUNTRY B",
        ...
    SUM(CASE WHEN REGIONS.LABEL = 'COUNTRY M' THEN
QUANTITY ELSE 0) AS "COUNTRY M"
        FROM TABLE
        GROUP BY PRODUCT;
``` where SELECT is the dimension function, the group identified by the dimension function is PRODUCT, or the first column of the input table, and the filter conditions are provided by the SUM CASE statements, corresponding with the values in the second column of the input table. Based on the pivot aggregation command, the dimensions of the output table include columns for products sold (e.g., PRODUCT) and countries identified by the filter conditions (e.g., COUNTRY A, COUNTRY B, . . . COUNTRY M). The dimensions of the output table include rows grouping the products sold so that each row identifies the quantities of a product sold for each country.

The intermediate mapping module 204 is responsible for generating intermediate hash maps and intermediate lookup maps based on the input table and the dimensions for the output table. An intermediate hash map groups data entries of the input table by the groups identified by the pivot aggregation command, which correspond with the outer "group by" columns of the output table. The intermediate hash map groups data entries belonging to the same groups together. The data entries belonging to the same groups are aggregated based on the filter condition values of the data entries. The filter condition values are the values associated with the filter conditions identified by the pivot aggregation command, which correspond with the inner "group by" columns of the output table. The data entries that have the same filter condition values are aggregated (e.g., summed) together. Aggregating the data entries with the same filter condition values combines the numeric measures (e.g., key figures) stored in the data entries so that one row in the intermediate hash map includes the combined numeric measures of the data entries in the input table that are of the same group and have the same filter condition value.

An intermediate lookup map lists all the filter condition values of the input table and, for each filter condition value, identifies the filter conditions satisfied by the filter condition value. For example, each row of the intermediate lookup map includes a filter condition value from the input table and all the filter conditions satisfied by the filter condition value. The filter conditions satisfied by the filter condition value can be listed as buckets.

The intermediate mapping module 204 generates the intermediate hash maps and the intermediate lookup maps in parallel. The intermediate mapping module 204 generates an intermediate hash map by iterating through the input table and identifying the groups of the data entries in the input table. For each data entry in the input table, a corresponding entry in the intermediate hash map is generated if there is no duplicate entry (e.g., an entry with the same group and filter condition value) in the intermediate hash map. If there is a duplicate entry in the intermediate hash map, the duplicate entry in the intermediate hash map is updated with the numeric measures associated with the data entry in the input table. The intermediate mapping module 204 generates an intermediate lookup map by iterating through the input table and identifying the filter condition values of the data entries in the input table. For each filter condition value in the dimension function (e.g., select), a corresponding entry in the intermediate lookup map is generated.

For example, in response to the pivot aggregation command described in the example for dimension module 202, an intermediate hash map is generated by iterating through the input table. For each row of the input table, if an entry exists in the intermediate hash map matching the product sold and the location where the product was sold, then the numeric measure for the quantity sold for the entry in the intermediate hash map is updated to add the numeric measure for the quantity sold for the row of the input table. If the intermediate hash map does not include an entry matching the product sold and the location where the product was sold, then a new entry is added to the intermediate hash map with the product sold, the location where the product was sold, and the numeric measure for the quantity sold for the row of the input table. The resulting intermediate hash map includes columns for products sold (e.g., PRODUCT), locations where the product was sold, and quantities for total products sold at each location. The rows of the resulting intermediate hash map include entries for each product sold in the input table.

Continuing the example, an intermediate lookup map is generated in parallel by iterating through the filter conditions. For each filter value a new entry is added to the intermediate lookup map with the country. The resulting intermediate lookup map includes columns for countries (e.g., COUNTRY A, COUNTRY B, . . . COUNTRY M). The rows of the resulting intermediate lookup map include entries for each location in the input table which is part of the result table.

In some examples, multiple intermediate hash maps are generated for an input table. Generating multiple intermediate hash maps allows for portions of the input table to be evaluated in parallel, improving the overall speed by which the intermediate hash maps are generated. Furthermore, as the intermediate mapping module 204 generates intermediate hash maps in parallel, intermediate hash maps are generated in one iteration through an input table.

In some examples, intermediate hash maps and intermediate lookup maps generated for a first pivot aggregation command on an input table are reused for a second pivot aggregation command on the input table. The intermediate mapping module 204 determines if the intermediate hash maps and the intermediate lookup maps generated for the first pivot aggregation command are compatible with the second pivot aggregation command and reuses the intermediate hash maps and the intermediate lookup maps based on the compatibility of the first pivot aggregation command and the second pivot aggregation command. For example, if the first pivot aggregation command and the second pivot aggregation command include the same group identifiers, rely on the same filter condition values, but use different filter conditions, then the intermediate hash maps generated for the first pivot aggregation command are reused for the second pivot aggregation command. A new intermediate lookup map is generated for the second pivot aggregation command to account for the different buckets associated with the different filter conditions. If the first pivot aggregation command and the second pivot aggregation command include different group identifiers but rely on the same filter conditions, then the intermediate lookup maps generated for the first pivot aggregation command is reused for the second pivot aggregation command. New intermediate hash maps are generated for the second pivot aggregation command to account for the different groups identified in the second pivot aggregation command. Reusing intermediate hash maps and intermediate lookup maps offers improved efficiency in use of computational resources where compatible pivot aggregation commands are provided.

The intermediate pages module 206 is responsible for generating intermediate pages based on the intermediate hash maps and the intermediate lookup maps. Intermediate pages include dimensions corresponding with the dimensions for the output table. The intermediate pages module 206 generates entries (e.g., rows) for the intermediate pages based on the entries of the intermediate hash maps. The intermediate pages module 206 iterates through the intermediate hash maps and, for each entry in the intermediate hash maps, looks up the filter conditions that the entry satisfies in the intermediate lookup maps. For each entry in the intermediate hash maps, a corresponding entry is made in the intermediate pages with the numeric measure for the entry in the intermediate hash map stored in the appropriate columns corresponding with the filter conditions the entry in the intermediate hash maps satisfies. Since the intermediate pages include dimensions corresponding with the dimensions for the output table, the entries made in the intermediate pages convert the entries of the intermediate hash maps into those that fit the dimensions for the output table.

For example, based on the intermediate hash map and the intermediate lookup map generated in the example described for the intermediate mapping module 204, an intermediate page is generated with columns for products sold (e.g., PRODUCT) and countries identified by the filter conditions (e.g., COUNTRY A, COUNTRY B, . . . COUNTRY M). For each row of the intermediate hash map, a corresponding entry is made in the intermediate page with the product from the intermediate hash map entered in the intermediate page in the column for products sold and with the numeric measure from the intermediate hash map entered in the column for the appropriate filter condition based on the intermediate lookup map. The resulting intermediate page includes the entries of the intermediate hash map converted to the dimensions for the output table, with columns for products sold and countries identified by the filter conditions.

In some examples, intermediate pages are generated in parallel with the intermediate hash maps. For example, if multiple intermediate hash maps are generated for an input table, the intermediate pages module 206 iterates through a first intermediate hash map once the first intermediate hash map is generated and while a second intermediate hash map is being generated. Thus, a first intermediate page is generated while the second intermediate hash map is being generated. This improves the overall speed by which the intermediate pages are generated. Furthermore, as the intermediate pages are generated based on intermediate hash maps and intermediate lookup maps, further iterations through an input table are obviated.

The aggregation module 208 is responsible for generating the output table based on the intermediate pages. The aggregation module 208 iterates through the intermediate pages, identifies entries in the intermediate pages that belong to the same group (e.g., have the same group by values), and aggregates the entries together. For example, for each entry of the intermediate pages, if an entry of the same group exists in the output table, then the numeric measures of the entry of the intermediate pages is aggregated (e.g., summed) with the entry in the output table. If no entry of the same group exists in the output table, then the entry of the intermediate pages is copied to the output table. As the intermediate pages have dimensions corresponding with the dimensions for the output table, the entries of the intermediate pages are copied to the output table without converting the data in the entries.

For example, based on the intermediate page generated in the example described for the intermediate pages module 206, an output table is generated with columns for products sold (e.g., PRODUCT) and countries identified by the filter conditions (e.g., COUNTRY A, COUNTRY B, . . . COUNTRY M). For each row of the intermediate page, a corresponding row is made in the output table if there is no existing row in the output table that matches the group of the row in the intermediate page. If there is an existing row in the output table that matches the group of the row in the intermediate page, then the numeric measures from the row in the intermediate page are added to the existing row in in the output table. The resulting output table provides the result of the pivot aggregation command using a number of linear complexity operations, improve computation complexity. Furthermore, the lookup operations used in generating the output table generally use less computational resources to perform relative to applying a set of filter conditions to each data entry of an input table. Also, because the output table is generated by iterating through the intermediate page, further iterations through the input table are obviated.

In some examples, at least some of the components shown in FIG. 2 are configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

In some examples, certain components or subsystems shown in FIG. 1 or FIG. 2 are implemented (individually or jointly) as microservices. A microservice subsystem (e.g., a microservice application) may have components that enable it to operate independently and communicate with other services. Example components of a microservice subsystem include:

Function logic: The function logic implements the functionality of the microservice subsystem, representing a specific capability or function that the microservice provides.

API interface: Microservices may communicate with each other components through well-defined APIs or interfaces, using lightweight protocols such as representational state transfer (REST) or messaging.

Data storage: A microservice subsystem may be responsible for its own data storage, which may be in the form of a database, cache, or other storage mechanism (e.g., using the database 134). This enables a microservice subsystem to operate independently of other microservices.

Service discovery: Microservice subsystems may find and communicate with other microservice subsystems of the server system 104. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

Figure 3:
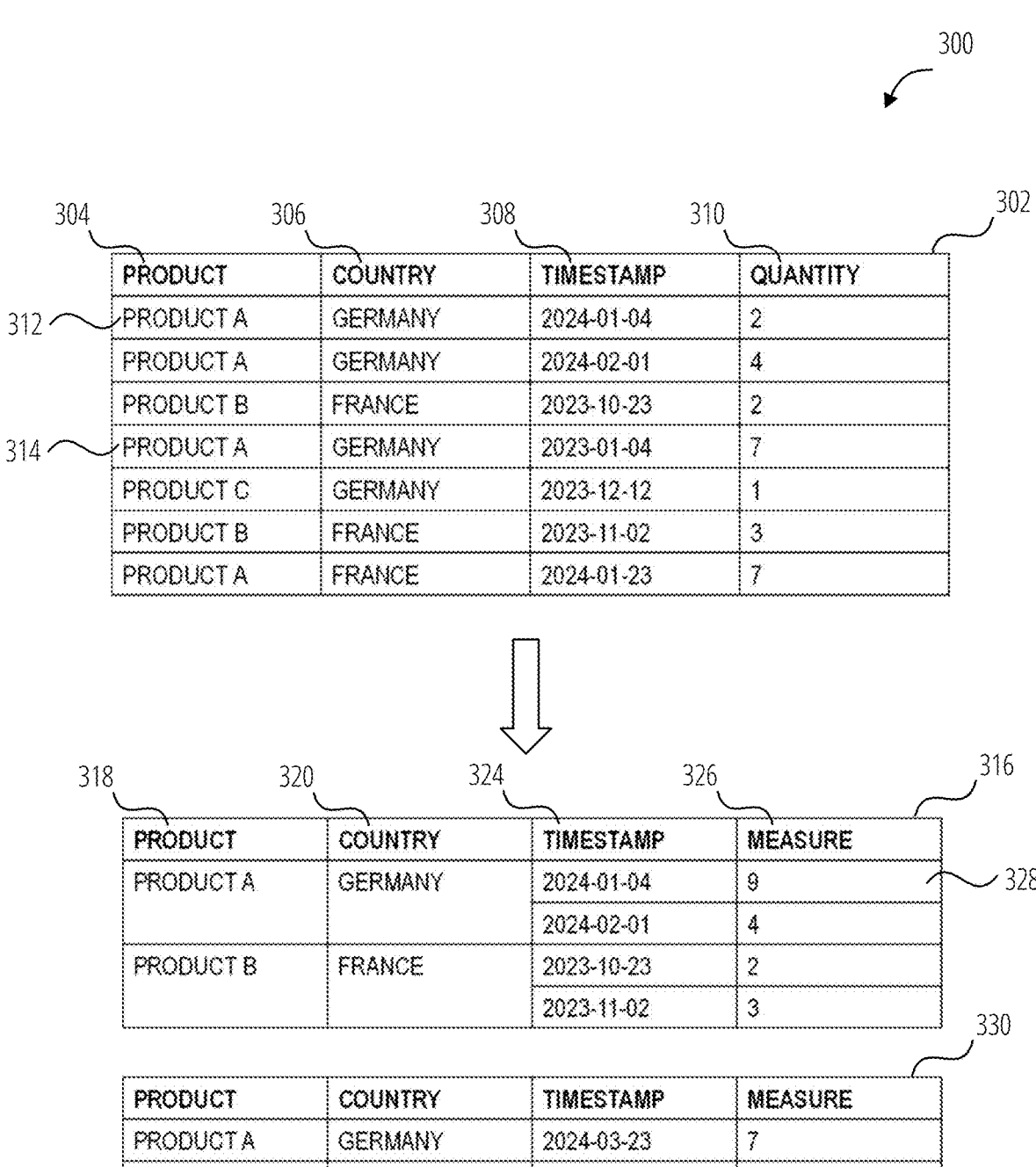
FIG. 3 is a block diagram of an example of performing pivot aggregation operations, according to some examples.

FIG. 3 is a block diagram of an example 300 of performing pivot aggregation operations, according to some examples. One or more of the various functions described in the example 300 may be implemented by, for example, the pivot aggregation system 130 of FIG. 1 or FIG. 2 or a similar pivot aggregation system.

The example 300 illustrates generation of a first intermediate hash map 316 and a second intermediate hash map 330 based on a pivot aggregation command for an input table 302. The input table 302 includes data entries for products sold in different countries. The input table 302 includes a first column 304 for products (e.g., PRODUCT), a second column 306 for countries where the products were sold (e.g., COUNTRY), a third column 308 for when the products were sold (e.g., TIMESTAMP), and a fourth column 310 for a quantity of products sold (e.g., QUANTITY). The rows of the input table 302 provide data for what products were sold (e.g., PRODUCT A, PRODUCT B, PRODUCT C), where the products were sold (e.g., GERMANY, FRANCE), when the products were sold (e.g., 2024 Jan. 4, 2024 Feb. 1), and how many products were sold (e.g., 2, 4).

The pivot aggregation command for the input table 302 provides the dimensions for an output table, which includes columns for groups and filter conditions. The first intermediate hash map 316 and the second intermediate hash map 330 are generated to group the rows of the input table 302 by the groups and filter condition identified from the pivot aggregation command. In this example, the pivot aggregation command is:

```
SELECT
    PRODUCT, COUNTRY,
    SUM(CASE WHEN TIMSTAMP BETWEEN '2023-10-01' AND
'2023-12-31' THEN QUANTITY ELSE 0) AS "Q4.2023",
    SUM(CASE WHEN TIMSTAMP BETWEEN '2023-10-01' AND
'2023-10-31' THEN QUANTITY ELSE 0) AS "M10.2023",
    ...
    SUM(CASE WHEN TIMSTAMP BETWEEN '2024-01-01' AND
'2024-03-31' THEN QUANTITY ELSE 0) AS "Q1.2024",
    SUM(CASE WHEN TIMSTAMP BETWEEN '2024-01-01' AND
'2024-01-31' THEN QUANTITY ELSE 0) AS "M1.2024"
    FROM LINEITEM
    GROUP BY PRODUCT, COUNTRY;
``` where SELECT is a dimension function applied to the input table 302, PRODUCT and COUNTRY are groups identified by the dimension function, and the SUM CASE statements provide the filter conditions (e.g., Q4.2023, M10.2023, Q1.2024, M1.2024). Based on the pivot aggregation command, the dimensions of the output table include columns for the identified groups (e.g., PRODUCT, COUNTRY), and time periods identified by the filter conditions (e.g., Q4.2023, M10.2023, Q1.2024, M1.2024).

Based on the input table 302 and the dimensions of the output table, the first intermediate hash map 316 and the second intermediate hash map 330 include columns for the identified groups, which are a first column 318 for products sold (e.g., PRODUCT) and a second column for countries where the products were sold (e.g., COUNTRY). The first intermediate hash map 316 and the second intermediate hash map 330 include a third column for filter condition values (e.g., TIMESTAMP) and a fourth column 326 for numeric measures (e.g., MEASURE). In the first intermediate hash map 316 and the second intermediate hash map 330, data entries of the input table 302 are grouped together by the identified groups, as shown in the first column 318 and the second column 320. In this example, the input table 302 has a first data entry 312 and a second data entry 314 that have the same group (e.g., PRODUCT, COUNTRY) and filter condition value (e.g., TIMESTAMP). The numeric measures (e.g., QUANTITY) of the first data entry 312 and the second data entry 314 are summed together in the entry 328 of the first intermediate hash map.

Figure 4:
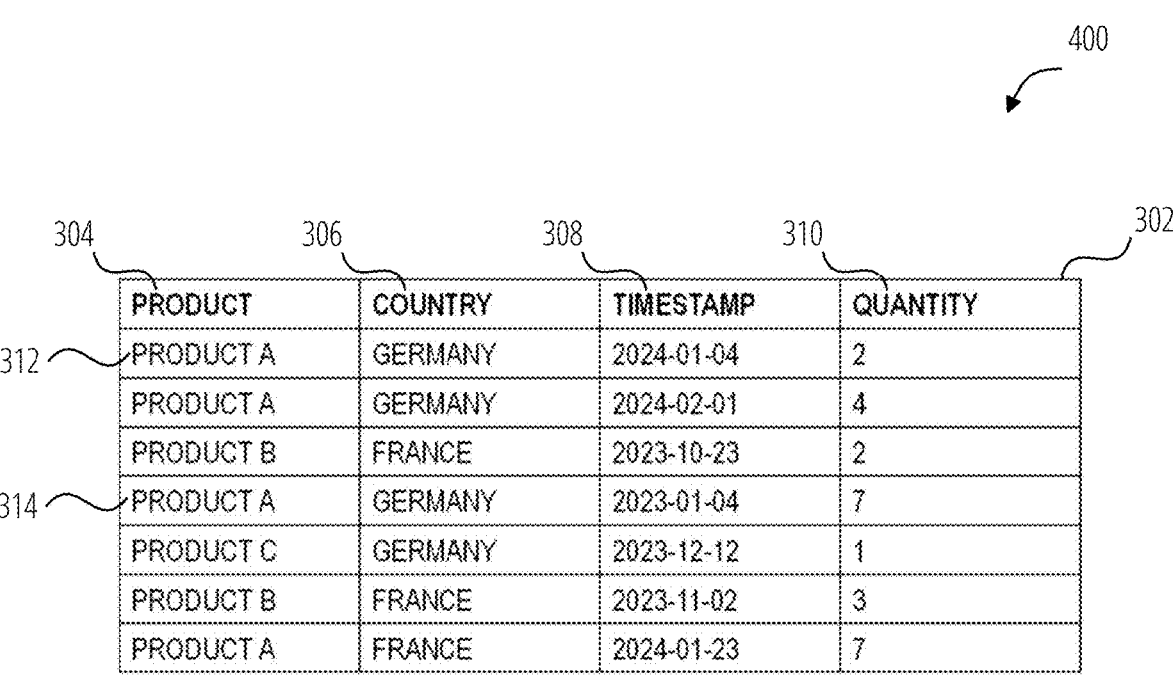
FIG. 4 is a block diagram of an example of performing pivot aggregation operations, according to some examples.

FIG. 4 is a block diagram of an example 400 of performing pivot aggregation operations, according to some examples. One or more of the various functions described in the example 400 may be implemented by, for example, the pivot aggregation system 130 of FIG. 1 or FIG. 2 or a similar pivot aggregation system.

The intermediate lookup map 402 lists, in a first column 404 (e.g., TIMESTAMP), the filter condition values of the input table 302. For each filter condition value, the filter conditions satisfied by the filter are listed in a second column 406 (e.g., BUCKETS). Duplicate filter condition values in the input table 302 are not listed in the intermediate lookup map 402. So, for the first data entry 312 and the second data entry 314, which have the same filter condition value (e.g., 2024 Jan. 4), there is one entry 408 in the intermediate lookup map 402.

FIG. 5 is a block diagram of an example 500 of performing pivot aggregation operations, according to some examples. One or more of the various functions described in the example 500 may be implemented by, for example, the pivot aggregation system 130 of FIG. 1 or FIG. 2 or a similar pivot aggregation system.

The example 500 illustrates generation of a first intermediate page 502 and a second intermediate page 524 based on the first intermediate hash map 316, the second intermediate hash map 330, and the intermediate lookup map 402. The first intermediate page 502 and the second intermediate page 524 are generated with dimensions corresponding with the output table. Here, the first intermediate page 502 and the second intermediate page 524 have a first column 504 (e.g., PRODUCT) and a second column 506 (e.g., COUNTRY) corresponding with the identified groups from the pivot aggregation command. The first intermediate page 502 and the second intermediate page 524 have a third column 508 (e.g., Q4.2023), a fourth column 510 (e.g., M10.2023), a fifth column 512 (e.g., M11.2023), a sixth column 514 (e.g., M12.2023), a seventh column 516 (e.g., Q1.2024), an eighth column 518 (e.g., M1.2024), a ninth column 520 (e.g., M2.2024), and a tenth column 522 (e.g., (M3.2024) corresponding with the filter conditions provided by the pivot aggregation command.

The first intermediate page 502 is generated by iterating through the first intermediate hash map 316. For each row in the first intermediate hash map 316, a corresponding row is added to the first intermediate page 502. Using the intermediate lookup map 402, the numeric measure in the fourth column 326 of the first intermediate hash map 316 is stored in the appropriate columns of the first intermediate page 502 based on the filter condition value in the third column 324 of the first intermediate hash map. For example, based on the filter condition value "2024 Jan. 4" in the third column 324 of the first intermediate hash map 316, the appropriate columns, which are the seventh column 516 and the eighth column 518 of the first intermediate page 502, are identified from the intermediate lookup map 402. The numeric measure "9" in the fourth column 326 of the first intermediate hash map 316 is stored in the seventh column 516 and the eighth column 518 of the first intermediate page 502. The same process is used to generate the second intermediate page 524 by iterating through the second intermediate hash map 330.

FIG. 6 is a block diagram of an example 600 of performing pivot aggregation operations, according to some examples. One or more of the various functions described in the example 600 may be implemented by, for example, the pivot aggregation system 130 of FIG. 1 or FIG. 2 or a similar pivot aggregation system.

The example 600 illustrates generation of an output table 602 based on the first intermediate page 502 and the second intermediate page 524. The output table 602 is generated by iterating through the first intermediate page 502 and the second intermediate page 524 and aggregating the numeric measures for the groups identified in the pivot aggregation command. Each row in the output table 602 corresponds with a product sold (e.g., PRODUCT A, PRODUCT B, PRODUCT C) and a country where the product was sold (e.g., GERMANY, FRANCE). The row includes the quantities of the product sold in the appropriate columns corresponding with when the product was sold. As illustrated here, the output table 602 converts the information stored in rows of the input table 302 as columns in the output table 602.

FIG. 7 is a flowchart showing an example method 700, according to some examples. One or more of the functions described in the example method 700 may be implemented by, for example, the pivot aggregation system 130 of FIG. 1 or FIG. 2 or a similar pivot aggregation system. Although the flowcharts depict particular sequences of operations, the sequences may be altered without departing from the scope of the subject matter disclosed herein. For example, some of the operations depicted may be performed in parallel or in a different sequence without materially affecting the functions described in the example method 700.

The example method 700 includes operations performed by a pivot aggregation system. At operation 702, the pivot aggregation system receives a pivot aggregation command to generate an output table based on an input table. At operation 704, the pivot aggregation system generates intermediate hash maps based on the pivot aggregation command and the input table. At operation 706, the pivot aggregation system generates an intermediate lookup map based on the pivot aggregation command and query conditions. At operation 708, the pivot aggregation system generates intermediate pages based on the intermediate hash maps and the intermediate lookup map. At operation 710, the pivot aggregation system generates the output table based on the intermediate pages.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one hardware processor; and a computer-readable medium storing instructions that, when executed by the at least one hardware processor, cause the at least one hardware processor to perform operations comprising receiving a first pivot aggregation command to generate a first output table based on an input table; generating a first intermediate hash map based on the first pivot aggregation command and the input table; generating a first intermediate lookup map based on the first pivot aggregation command and query conditions; generating a first intermediate page based on the first intermediate hash map and the first intermediate lookup map; and generating the first output table based on the first intermediate page.

In Example 2, the subject matter of Example 1 comprises wherein generating the first intermediate hash map comprises: identifying a group for data entries of the input table based on the first pivot aggregation command; identifying a filter condition value for the data entries of the input table based on the first pivot aggregation command; and aggregating the data entries with a same group and a same filter condition value, the first intermediate hash map comprising entries based on the aggregated data entries.

In Example 3, the subject matter of Example 2 comprises wherein aggregating the data entries comprises summing numeric measures of the data entries.

In Example 4, the subject matter of any of Example 1-3 comprises wherein the first intermediate hash map comprises a column for each group in the first pivot aggregation command.

In Example 5, the subject matter of any of Examples 1-4 comprises wherein generating the first intermediate lookup map comprises: identifying filter conditions based on the first pivot aggregation command; identifying filter condition values for data entries of the query conditions; and listing, for each filter condition value, the filter conditions satisfied by the filter condition value.

In Example 6, the subject matter of any of Examples 1-5 comprises wherein generating the first intermediate page comprises: for each entry in the first intermediate hash map: identifying a filter condition that satisfies a filter condition value for the entry based on the first intermediate lookup map; and generating a corresponding entry in the first intermediate page based on the entry and the filter condition.

In Example 7, the subject matter of any of Examples 1-6 comprises wherein the first intermediate page and the first output table have a same number of columns.

In Example 8, the subject matter of any of Examples 1-7 comprises wherein the first intermediate page includes a column for each filter condition in the first pivot aggregation command.

In Example 9, the subject matter of any of Examples 1-8 comprises wherein generating the first output table comprises: identifying entries in the first intermediate page that belong to a group based on group by values of the entries; and aggregating the entries that belong to the group.

In Example 10, the subject matter of any of Example 1-9 comprises wherein the first intermediate hash map is generated based on a first iteration through the input table, the first intermediate page is generated based on a second iteration through the first intermediate hash map, and the first output table is generated based on a third iteration through the first intermediate page.

In Example 11, the subject matter of any of Examples 1-10 comprises generating a second intermediate hash map based on the first pivot aggregation command and the input table, the first intermediate hash map based on a first portion of the input table, the second intermediate hash map based on a second portion of the input table; and generating a second intermediate page, the first intermediate page based on the first intermediate hash map, the second intermediate page based on the second intermediate hash map.

In Example 12, the subject matter of any of Examples 1-11 comprises wherein the second intermediate page is generated in parallel with the first intermediate hash map.

In Example 13, the subject matter of any of Examples 1-12 comprises wherein the first intermediate hash map and the first intermediate lookup map are generated in parallel.

In Example 14, the subject matter of any of Examples 1-13 comprises receiving a second pivot aggregation command to generate a second output table based on the input table; generating a second hash map based on the second pivot aggregation command and the input table; using the first intermediate lookup map based on a compatibility between the first pivot aggregation command and the second pivot aggregation command; generating a second intermediate page based on the second hash map and the first intermediate lookup map; and generating the second output table based on the second intermediate page.

Example 15 is a method comprising: receiving a first pivot aggregation command to generate a first output table based on an input table; generating a first intermediate hash map based on the first pivot aggregation command and the input table; generating a first intermediate lookup map based on the first pivot aggregation command and query conditions; generating a first intermediate page based on the first intermediate hash map and the first intermediate lookup map; and generating the first output table based on the first intermediate page.

In Example 16, the subject matter of Example 15 comprises wherein generating the first intermediate hash map comprises: identifying a group for data entries of the input table based on the first pivot aggregation command; identifying a filter condition value for the data entries of the input table based on the first pivot aggregation command; and aggregating the data entries with a same group and a same filter condition value, the first intermediate hash map comprising entries based on the aggregated data entries.

In Example 17, the subject matter of any of Examples 15-16 comprises wherein generating the first intermediate lookup map comprises: identifying filter conditions based on the first pivot aggregation command; identifying filter condition values of the query conditions; and listing, for each filter condition value, the filter conditions satisfied by the filter condition value.

Example 18 is one or more non-transitory computer-readable media storing computer-executable instructions that, when executed by a computing system, cause the computing system to perform operations comprising: receiving a first pivot aggregation command to generate a first output table based on an input table; generating a first intermediate hash map based on the first pivot aggregation command and the input table; generating a first intermediate lookup map based on the first pivot aggregation command and query conditions; generating a first intermediate page based on the first intermediate hash map and the first intermediate lookup map; and generating the first output table based on the first intermediate page.

In Example 19, the subject matter of Example 18 comprises wherein generating the first intermediate hash map comprises: identifying a group for data entries of the input table based on the first pivot aggregation command; identifying a filter condition value for the data entries of the input table based on the first pivot aggregation command; and aggregating the data entries with a same group and a same filter condition value, the first intermediate hash map comprising entries based on the aggregated data entries.

In Example 20, the subject matter of any of Examples 18-19 comprises wherein generating the first intermediate lookup map comprises: identifying filter conditions based on the first pivot aggregation command; identifying filter condition values of the query conditions; and listing, for each filter condition value, the filter conditions satisfied by the filter condition value.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 8:
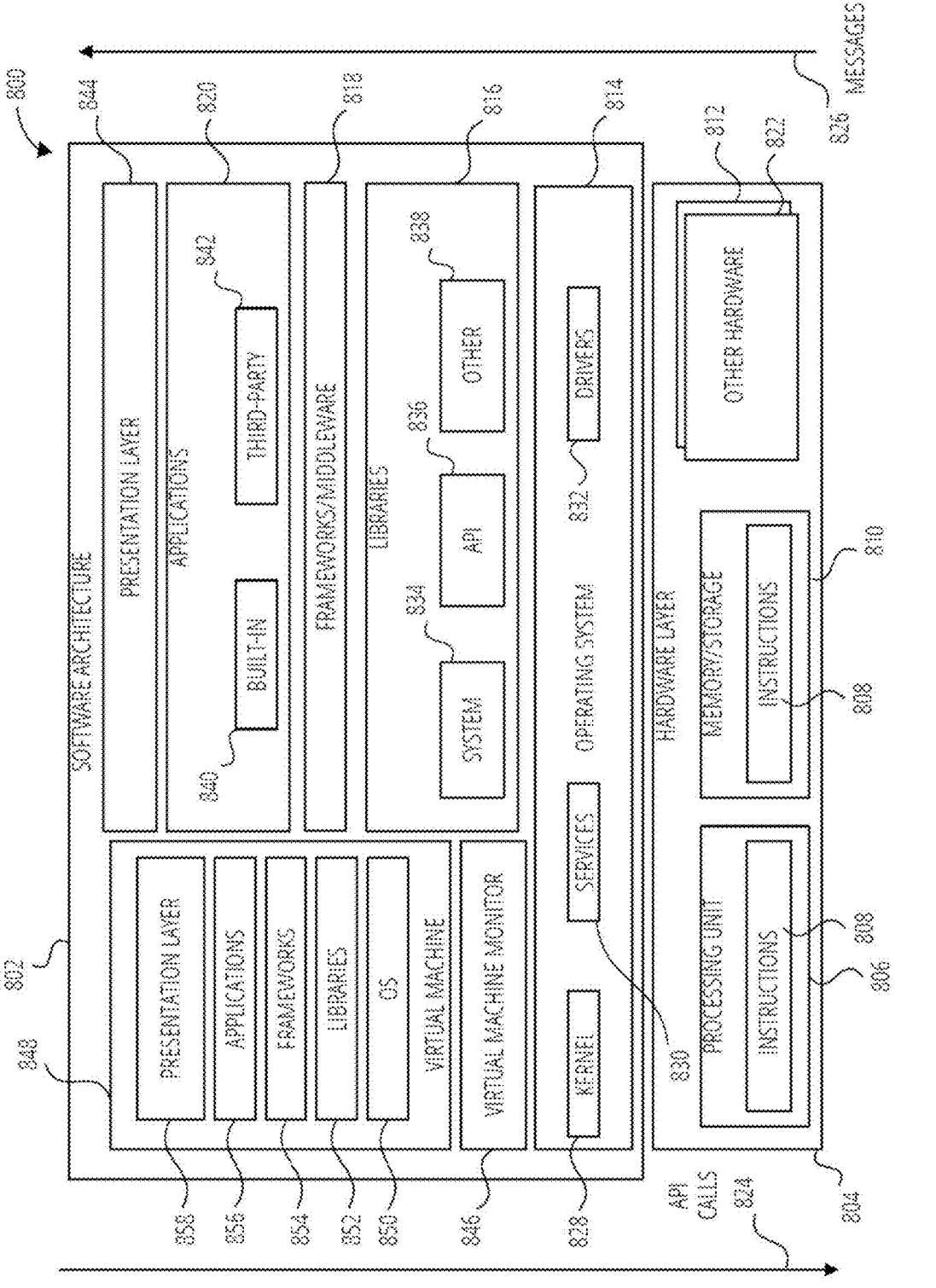
FIG. 8 is a block diagram showing a software architecture for a computing device, according to some examples.

FIG. 8 is a block diagram 800 showing a software architecture 802 for a computing device, according to some examples. The software architecture 802 may be used in conjunction with various hardware architectures, for example, as described herein. FIG. 8 is merely a non-limiting illustration of a software architecture, and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system of FIG. 9.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 and other hardware 822 which represent any other hardware of the hardware layer 804, such as the other hardware illustrated as part of the software architecture 802.

In the architecture of FIG. 8, the software architecture 802 may be conceptualized as a stack of layers where each layer provides particular functionality. For example, the software architecture 802 may include layers such as an operating system 814, libraries 816, frameworks/middleware layer 818, applications 820, and presentation layer 844. Operationally, the applications 820 or other components within the layers may invoke API calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the software architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 816 may provide a common infrastructure that may be utilized by the applications 820 or other components or layers. The libraries 816 typically provide functionality that allows other software modules to perform tasks in an easier fashion than to interface directly with the underlying operating system 814 functionality (e.g., kernel 828, services 830 or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware layer 818 may provide a higher-level common infrastructure that may be utilized by the applications 820 or other software components/modules. For example, the frameworks/middleware layer 818 may provide various graphic user interface (GUI) functions, high-level resource management, high-level location services, and so forth. The frameworks/middleware layer 818 may provide a broad spectrum of other APIs that may be utilized by the applications 820 or other software components/modules, some of which may be specific to a particular operating system or platform.

The applications 820 include built-in applications 840 or third-party applications 842. Examples of representative built-in applications 840 may include, but are not limited to, a contacts application, a browser application, a book reader application, a location application, a media application, a messaging application, or a game application. Third-party applications 842 may include any of the built-in applications as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built in operating system functions (e.g., kernel 828, services 830 or drivers 832), libraries (e.g., system libraries 834, API libraries 836, and other libraries 838), and frameworks/middleware layer 818 to create user interfaces to interact with users of the system. Alternatively, or additionally, in some systems, interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine as well as the interface with the host operating system (e.g., operating system 814). A software architecture executes within the virtual machine 848 such as an operating system 850, libraries 852, frameworks/middleware 854, applications 856 or presentation layer 858. These layers of software architecture executing within the virtual machine 848 can be the same as corresponding layers previously described or may be different.

Certain examples are described herein as including logic or a number of components, modules, or mechanisms. Modules or components may constitute either software modules/components (e.g., code embodied (1) on a non-transitory machine-readable medium or (2) in a transmission signal) or hardware-implemented modules/components. A hardware-implemented module/component is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module/component that operates to perform certain operations as described herein.

In various examples, a hardware-implemented module/component may be implemented mechanically or electronically. For example, a hardware-implemented module/component may comprise dedicated circuitry or logic that is permanently configured (e.g., as a special-purpose processor, such as a field programmable gate array (FPGA) or an application-specific integrated circuit (ASIC)) to perform certain operations. A hardware-implemented module/component may also comprise programmable logic or circuitry (e.g., as encompassed within a general-purpose processor or another programmable processor) that is temporarily configured by software to perform certain operations.

Accordingly, the term "hardware-implemented module" or "hardware-implemented component" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules/components are temporarily configured (e.g., programmed), each of the hardware-implemented modules/components need not be configured or instantiated at any one instance in time. For example, where the hardware-implemented modules/components comprise, a general-purpose processor configured using software, the general-purpose processor may be configured as respective different hardware-implemented modules/components at different times. Software may accordingly configure a processor, for example, to constitute a particular hardware-implemented module/component at one instance of time and to constitute a different hardware-implemented module/component at a different instance of time.

Hardware-implemented modules/components can provide information to, and receive information from, other hardware-implemented modules/components. Accordingly, the described hardware-implemented modules/components may be regarded as being communicatively coupled. Where multiple of such hardware-implemented modules/components exist contemporaneously, communications may be achieved through signal transmission (e.g., over appropriate circuits and buses that connect the hardware-implemented modules/components). In examples in which multiple hardware-implemented modules/components are configured or instantiated at different times, communications between such hardware-implemented modules/components may be achieved, for example, through the storage and retrieval of information in memory structures to which the multiple hardware-implemented modules/components have access. For example, one hardware-implemented module/component may perform an operation and store the output of that operation in a memory device to which it is communicatively coupled. A further hardware-implemented module/component may then, at a later time, access the memory device to retrieve and process the stored output.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules/components that operate to perform one or more operations or functions. The modules/components referred to herein may, in some examples, comprise processor-implemented modules/components.

Similarly, the methods described herein may be at least partially processor-implemented. For example, at least some of the operations of a method may be performed by one or more processors or processor-implemented modules/components. The performance of certain of the operations may be distributed among the one or more processors, not only residing within a single machine, but deployed across a number of machines.

The one or more processors may also operate to support performance of the relevant operations in a "cloud computing" environment or as a "software as a service (Saas)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

Figure 9:
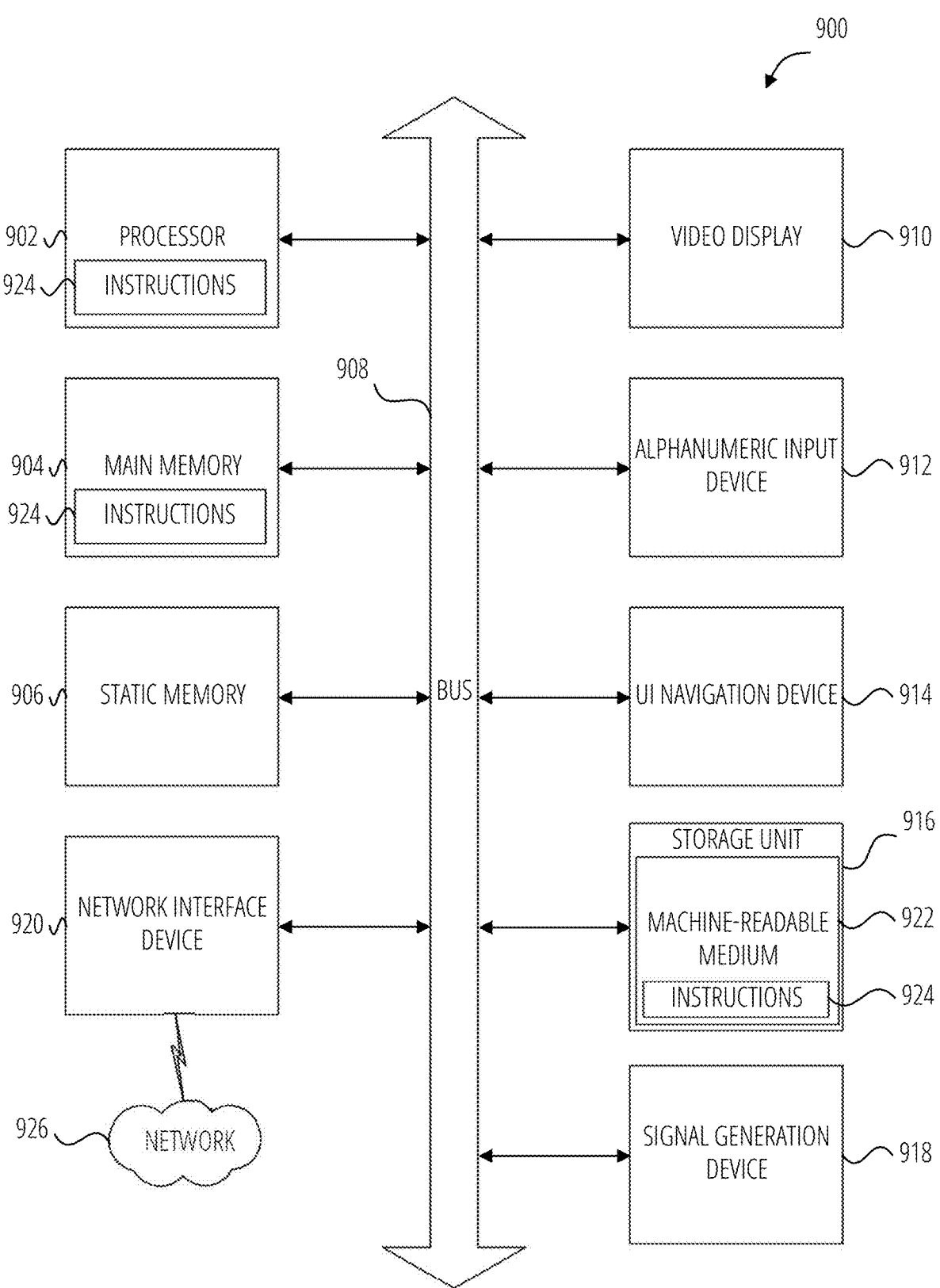
FIG. 9 is a block diagram of a machine in the form of a computer system, according to some examples, within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative examples, the machine operates as a standalone device or may be connected (e.g., net worked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a GPU, or both), a primary or main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a UI navigation (or cursor control) device 914 (e.g., a mouse), a storage unit 916, a signal generation device 918 (e.g., a speaker), and a network interface device 920.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. A processor may be emulated in software, running on a physical processor, as a virtual processor or virtual circuit. The virtual processor may behave like an independent processor but is implemented in software rather than hardware.

The storage unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 or within the processor 902 during execution thereof by the computer system 900, with the main memory 904 and the processor 902 also each constituting a machine-readable medium 922.

While the machine-readable medium 922 is shown in accordance with some examples to be a single medium, the term "machine-readable medium" may include a single medium or multiple media (e.g., a centralized or distributed database, or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of a machine-readable medium 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 924 may further be transmitted or received over a communications network 926 using a transmission medium. The instructions 924 may be transmitted using the network interface device 920 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 924 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the subject matter may be referred to herein, individually or collectively, by the term "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. Except as otherwise indicated, the word "or" in reference to a list of two or more items, covers all of the following interpretations of the word: any one of the items in the list, all of the items in the list, and any combination of the items in the list.

Although some examples, such as those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence. The term "operation" is used to refer to elements in the drawings of this disclosure for ease of reference and it will be appreciated that each "operation" may identify one or more operations, processes, actions, or steps, and may be performed by one or multiple components.

What is claimed is:

1. A system comprising:

at least one hardware processor; and a computer-readable medium storing instructions that, when executed by the at least one hardware processor, cause the at least one hardware processor to perform operations comprising:

receiving a first pivot aggregation command to generate a first output table based on an input table;

generating a first intermediate hash map based on the first pivot aggregation command and the input table;

generating a first intermediate lookup map based on the first pivot aggregation command and query conditions;

generating a first intermediate page based on the first intermediate hash map and the first intermediate lookup map;

generating the first output table based on the first intermediate page;

receiving a second pivot aggregation command to generate a second output table based on the input table, wherein the second pivot aggregation command comprises a different filter condition from the first pivot aggregation command or a different grouping from the first pivot aggregation command; and generating the second output table by reusing the first intermediate hash map and generating a second intermediate lookup map to apply the different filter condition or by reusing the first intermediate lookup map and generating a second intermediate hash map to apply the different grouping.

2. The system of claim 1, wherein generating the first intermediate hash map comprises:

identifying a group for data entries of the input table based on the first pivot aggregation command;

identifying a filter condition value for the data entries of the input table based on the first pivot aggregation command; and aggregating the data entries with a same group and a same filter condition value, the first intermediate hash map comprising entries based on the aggregated data entries.

3. The system of claim 2, wherein aggregating the data entries comprises summing numeric measures of the data entries.

4. The system of claim 1, wherein the first intermediate hash map comprises a column for each group in the first pivot aggregation command.

5. The system of claim 1, wherein generating the first intermediate lookup map comprises:

identifying filter conditions based on the first pivot aggregation command;

identifying filter condition values of the query conditions; and listing, for each filter condition value, the filter conditions satisfied by the filter condition value.

6. The system of claim 1, wherein generating the first intermediate page comprises:

for each entry in the first intermediate hash map:

identifying a filter condition that satisfies a filter condition value for the entry based on the first intermediate lookup map; and generating a corresponding entry in the first intermediate page based on the entry and the filter condition.

7. The system of claim 1, wherein the first intermediate page and the first output table have a same number of columns.

8. The system of claim 1, wherein the first intermediate page includes a column for each filter condition in the first pivot aggregation command.

9. The system of claim 1, wherein generating the first output table comprises:

identifying entries in the first intermediate page that belong to a group based on group by values of the entries; and aggregating the entries that belong to the group.

10. The system of claim 1, wherein the first intermediate hash map is generated based on a first iteration through the input table, the first intermediate page is generated based on a second iteration through the first intermediate hash map, and the first output table is generated based on a third iteration through the first intermediate page.

11. The system of claim 1, the operations further comprising:

generating a second intermediate hash map based on the first pivot aggregation command and the input table, the first intermediate hash map based on a first portion of the input table, the second intermediate hash map based on a second portion of the input table; and generating a second intermediate page, the first intermediate page based on the first intermediate hash map, the second intermediate page based on the second intermediate hash map.

12. The system of claim 11, wherein the second intermediate page is generated in parallel with the first intermediate hash map.

13. The system of claim 1, wherein the first intermediate hash map and the first intermediate lookup map are generated in parallel.

14. The system of claim 1, the operations further comprising:

generating the second intermediate hash map based on the second pivot aggregation command and the input table;

reusing the first intermediate lookup map based on a compatibility between the first pivot aggregation command and the second pivot aggregation command; and generating a second intermediate page based on the second intermediate hash map and the first intermediate lookup map.

15. A method comprising:

receiving a first pivot aggregation command to generate a first output table based on an input table;

generating a first intermediate hash map based on the first pivot aggregation command and the input table;

generating a first intermediate lookup map based on the first pivot aggregation command and query conditions;

generating a first intermediate page based on the first intermediate hash map and the first intermediate lookup map;

generating the first output table based on the first intermediate page;

receiving a second pivot aggregation command to generate a second output table based on the input table, wherein the second pivot aggregation command comprises a different filter condition from the first pivot aggregation command or a different grouping from the first pivot aggregation command; and generating the second output table by reusing the first intermediate hash map and generating a second intermediate lookup map to apply the different filter condition or by reusing the first intermediate lookup map and generating a second intermediate hash map to apply the different grouping.

16. The method of claim 15, wherein generating the first intermediate hash map comprises:

identifying a group for data entries of the input table based on the first pivot aggregation command;

identifying a filter condition value for the data entries of the input table based on the first pivot aggregation command; and aggregating the data entries with a same group and a same filter condition value, the first intermediate hash map comprising entries based on the aggregated data entries.

17. The method of claim 15, wherein generating the first intermediate lookup map comprises:

identifying filter conditions based on the first pivot aggregation command;

identifying filter condition values of the query conditions; and listing, for each filter condition value, the filter conditions satisfied by the filter condition value.

18. One or more non-transitory computer-readable media storing computer-executable instructions that, when executed by a computing system, cause the computing system to perform operations comprising:

receiving a first pivot aggregation command to generate a first output table based on an input table;

generating a first intermediate hash map based on the first pivot aggregation command and the input table;

generating a first intermediate lookup map based on the first pivot aggregation command and query conditions;

generating a first intermediate page based on the first intermediate hash map and the first intermediate lookup map;

generating the first output table based on the first intermediate page;

receiving a second pivot aggregation command to generate a second output table based on the input table, wherein the second pivot aggregation command comprises a different filter condition from the first pivot aggregation command or a different grouping from the first pivot aggregation command; and generating the second output table by reusing the first intermediate hash map and generating a second intermediate lookup map to apply the different filter condition or by reusing the first intermediate lookup map and generating a second intermediate hash map to apply the different grouping.

19. The one or more non-transitory computer-readable media of claim 18, wherein generating the first intermediate hash map comprises:

identifying a group for data entries of the input table based on the first pivot aggregation command;

identifying a filter condition value for the data entries of the input table based on the first pivot aggregation command; and aggregating the data entries with a same group and a same filter condition value, the first intermediate hash map comprising entries based on the aggregated data entries.

20. The one or more non-transitory computer-readable media of claim 18, wherein generating the first intermediate lookup map comprises:

identifying filter conditions based on the first pivot aggregation command;

identifying filter condition values of the query conditions; and listing, for each filter condition value, the filter conditions satisfied by the filter condition value.

\* \* \* \* \*